Feb. 1, 1966  A. J. MIKESKA  3,232,643
THERMAL SLEEVE
Filed Nov. 26, 1963  2 Sheets-Sheet 1
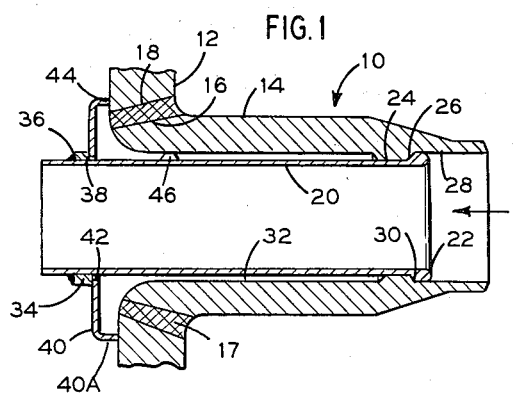
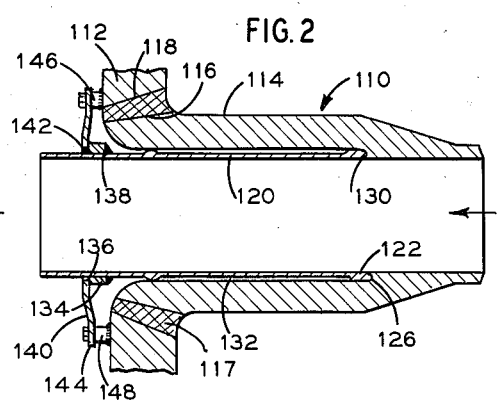
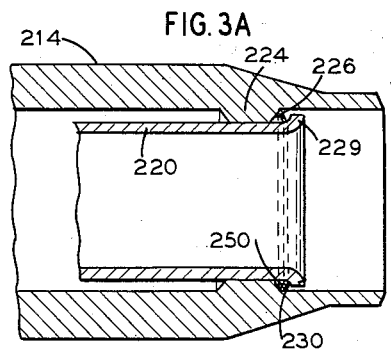
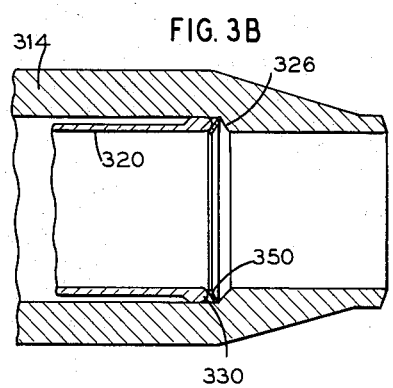
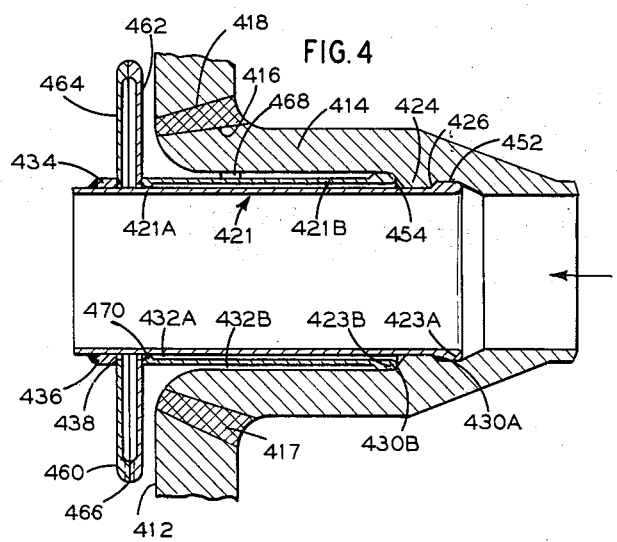
*INVENTOR.*
Alan J. Mikeska
BY
ATTORNEY Feb. 1, 1966  A. J. MIKESKA  3,232,643
THERMAL SLEEVE Filed Nov. 26, 1963  2 Sheets-Sheet 2

United States Patent Office 3,232,643
Patented Feb. 1, 1966

3,232,643
THERMAL SLEEVE
Alan J. Mikeska, Annandale, Va., assignor to The Babcock & Wilcox Company, New York, N.Y., a corporation of New Jersey
Filed Nov. 26, 1963, Ser. No. 326,155
11 Claims. (Cl. 285—158)

This invention relates in general to fluid inlet connections for vessels, and more particularly, it concerns a thermal sleeve arrangement for use in such inlet connections.

Thermal stresses have long been a problem in vessels employing inlet connections which deliver a fluid whose temperature is substantially different from that of the vessel wall and of the fluid within the vessel. If the vessel, heated by conduction to the temperature of the fluid it contains, is suddenly subjected to a considerably different temperature, abnormal stresses are likely to develop in the vessel walls, for example, in the vicinity of the inlet connection to the vessel wall, when the connection is passing fluid of a temperature substantially different from that of the vessel wall. Various types of thermal sleeves have been devised to overcome this problem of thermal stressing, however, they have not completely solved the problem, particularly, where the difference in temperature is relatively great.

A thermal sleeve may be defined as a spaced internal sleeve lining of a connection, for introducing a fluid of one temperature into a vessel containing fluid at a substantially different temperature, used to avoid abnormal strains. Thermal sleeves are widely used in connecting pipe lines to boiler drums, heat exchangers, chemical reactors, autoclaves and the like to overcome problems associated with thermal stressing produced by large temperature differences in contiguous metal parts. In the past, thermal sleeves have been welded to, or integrally formed with the inlet or nozzle connection to a vessel, as in Kerr, Patent No. 2,063,441, issued December 8, 1936. Another example of a similar type of thermal sleeve is shown in Kerr, Patent No. 2,203,357, issued June 4, 1940, which discloses a double sleeve about the point of attachment between the nozzle and the vessel. Still another example of a thermal sleeve is shown in Langvand, Patent No. 2,633,831, where the nozzle is welded to a push-out portion of the vessel and the thermal sleeve in turn is welded to the outer end of the nozzle. However, such arrangements give rise to high cyclic thermal stresses about the sleeve-to-nozzle connection due to the mutual restraint at that point during temperature transients.

Loose sleeves have also been used in combination with the nozzles, however, they have a tendency to shrink away from the nozzle under severe temperature transients and cause the incoming fluid to by-pass through the annular space between the sleeve and the nozzle. Since it is the purpose of the annular space to provide a barrier of stagnant fluid between the sleeve and the nozzle and vessel itself, leakage of the incoming fluid into the annular space tends to cause thermal stressing or shocking of the vessel wall thereby negating the purpose for which the sleeve is provided.

Another type of thermal sleeve which has been employed is the double-ended sleeve each end of which is rolled into engagement with a nozzle which penetrates the vessel wall and extends both outwardly from and inwardly into the vessel. This type of sleeve is expensive and difficult to fabricate and assemble. Further, it also has the problem of shrinking from engagement with the nozzle wall and permitting the incoming fluid to by-pass into the annular space and contact the vessel wall.

One of the primary objects of this invention is to provide a thermal sleeve which is neither an integral part of, nor integrally attached to the nozzle, but which, nevertheless, is maintained in substantially fluid-tight relationship with the nozzle.

Another object of the invention is to provide a thermal sleeve which is maintained in substantially fluid-tight engagement with the nozzle by means of a spring-like member.

Still another object of this invention is to provide an arrangement which will accommodate the temperature transients which develop at the vessel inlet without loss of the fluid-tight engagement initially imparted to the sleeve and the nozzle during fabrication and assembly.

Therefore, the present invention provides a thermal sleeve arrangement for a tubular member attached and extending outwardly from an opening penetrating the wall of a vessel. Disposed within the tubular member, and in coaxial alignment therewith, is a sleeve whose outer end is maintained in substantially fluid-tight relationship with a shoulder on the tubular member and with the inner end extending into the vessel. The sleeve is arranged in spaced relationship with the tubular member so that an annular space is provided between the two. Spring means are arranged to bear against the sleeve and assure that it remains in fluid-tight engagement with the tubular member.

Additionally, the present invention provides a collar on the inner end of the sleeve which forms a bearing surface against which the spring means acts to maintain the particular sleeve either in tension or compression so that substantially no fluid flows through the opposed bearing surfaces of the sleeve and of the tubular member.

Still another feature of the invention is the use of an annular disk spring which is disposed about the sleeve so that it bears against the collar on the sleeve about its inner periphery and bears against the vessel about its outer periphery for maintaining the sleeve and tubular member in fluid-tight engagement.

The various features of novelty which characterize the invention are pointed out with particularity in the claims annexed to and forming a part of this specification. For a better understanding of the invention, it operating advantages and specific objects attained by its use, reference should be had to the accompanying drawings and descriptive matter in which we have illustrated and described preferred embodiments of the invention.

Of the drawings:

FIG. 1 is a longitudinal cross section of a nozzle connection to a vessel disclosing one embodiment of the thermal sleeve arrangement of the present invention;

FIG. 2 is similar to FIG. 1 disclosing another embodiment of the present invention;

FIG. 3A is an enlarged partial longitudinal cross section showing a Belleville spring disposed between opposed bearing surfaces of the nozzle and sleeve of FIG. 1;

FIG. 3B is an enlarged partial longitudinal cross section showing another arrangement of the Belleville spring of FIG. 3A disposed between opposed bearing surfaces of the nozzle and sleeve of FIG. 2;

FIG. 4 is a longitudinal sectional view of still another embodiment of the present invention illustrating the use of a double sleeve within the nozzle;

In the drawings similar elements are identified by like reference numerals but with the addition of a prefix numeral in FIG. 2 et seq. to distinguish from the embodiment shown in FIG. 1.

Figure 6:
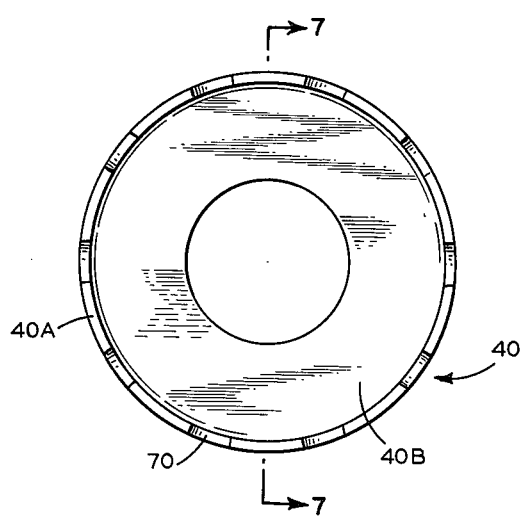
FIG. 6 is a plan view of the spring shown in FIG. 5.

In FIG. 1 a nozzle assembly 10 is shown integrally attached to a vessel 12. The nozzle assembly comprises a tubular member 14 welded, as at 17, at its inner end 16 to an opening 18 in the vessel and extending outwardly therefrom. Positioned coaxially within the tubular member 14 is a sleeve 20. The sleeve extends from its outer end 22, which is located near the outer extremity of the tubular member 14, projecting into the interior of the vessel 12.

Slightly inward of the outer end 22 of the sleeve 20 there is an inwardly projecting annular-shaped protuberance or rib 24 on the tubular member 14. The rib 24 has a generally transversely disposed annular shoulder 26 facing away from the vessel 12. At its outer end 22 the sleeve 20 has a built-up section with an outside diameter approximately equal to the inside diameter defining the adjacent surface 28 of the tubular member. A short distance inwardly from its outer end the outside diameter of the sleeve is reduced, and a tapered bearing surface 30 provided with seats against the shoulder 26 on the rib 24 of the tubular member. Inwardly of the rib 24 the sleeve and the tubular member are spaced apart so that they form an annular space 32 which opens into the interior of the vessel.

Figure 5:
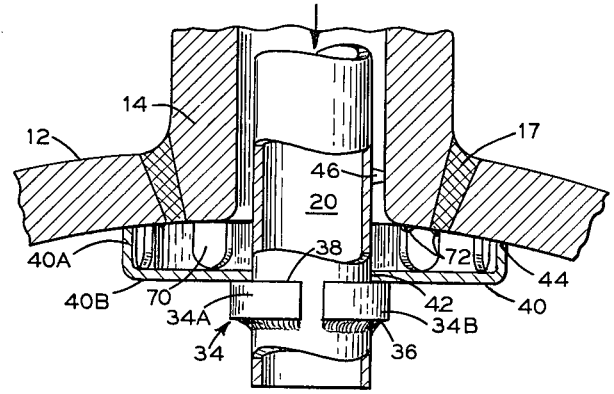
FIG. 5 is an enlarged longitudinal view partly in section showing the disposition of the spring member of FIG. 1 with relation to the sleeve and the vessel.

Within the vessel a fitted collar 34 is disposed about the sleeve 20. As shown in FIG. 5 this collar is formed as two substantially semi-circular pieces 34A, 34B to facilitate assembly upon the sleeve. The collar 34 is secured to the sleeve about its inner circumferential face 36. The outer face 38, projecting outward from the tube wall, is arranged to form a bearing surface.

Coaxially disposed about the sleeve is an annular-shaped disk-like spring 40 with a circumscribing outstanding rib 40A. The inner peripheral surface 42 of the disk spring is spaced closely from the outer surface of the sleeve 20 and cooperates with the collar 34 to seat the spring 40 upon the outer face 38 of the collar. The outer peripheral surface 44 of the rim 40A bears against the wall of the vessel 12. At the inner end of the tubular member 14 multiple spacers 46 are attached to the sleeve 20 for holding it in spaced relationship with the tubular member 14.

In operation the action of the disk spring 40 upon the collar 34 on the sleeve 20 maintains the bearing surface 30 of the sleeve in substantially fluid-tight engagement with the opposed shoulder 26 on the tubular member so that the fluid entering the vessel through the sleeve 20 is prevented from entering the annular space 32 and thereby imposing a thermal shock on the vessel wall, which is at a temperature different than that of the incoming fluid. It will be observed that this thermal sleeve arrangement could be employed whether the incoming fluid is either considerably hotter or considerably colder than the fluid contained within the vessel. For purposes of description let us assume that a colder fluid is entering the vessel through the nozzle assembly 10. The effect of the colder fluid will be to cause the sleeve 20 to contract in relation to the higher temperature tubular member and vessel. Due to its resilient nature, as the sleeve contracts and its length shortens, the spring will deflect, maintaining a tensile force on the sleeve 20 and keep the bearing surface 30 in fluid-tight engagement with the shoulder 26 of the tubular member 14.

In FIG. 5 it can be seen that fluid contained in the vessel will enter the annular space 32 to form a thermal barrier between the sleeve 20 and the opposite wall of the tubular member 14 and maintain the tubular member at substantially the temperature of the fluid within the vessel.

Another embodiment of the invention is shown in FIG. 2 which differs from that shown in FIG. 1 in that the sleeve is maintained in substantially fluid-tight relationship by compression induced by the reaction of the spring rather than by the tension reaction of the FIG. 1 arrangement. The nozzle assembly 110 is attached to the vessel 112, as at 117 and comprises tubular member 114 attached at its inner end 116 to an opening 118 in the vessel 112. Within the tubular member 114 there is coaxially positioned a sleeve 120 which has its outer end 122 located exteriorly of the vessel, with the sleeve itself extending through the aperture in the vessel wall and into the vessel.

The inside diameter of that portion of the tubular member 114, which is adjacent the sleeve 120, is larger than the inside diameter of the member extending beyond the sleeve so that a shoulder 126 is formed in its inner surface. The outer end 122 of the sleeve is of a greater outside diameter than the remainder of the sleeve so the heavier or thicker outer end portion provides a bearing surface 130 which seats snugly against the shoulder 126. Since the outside diameter of the sleeve 120 is less than the outside diameter at the heavier wall outer end 122, it cooperates with the tubular member 114 to form an annular space 132 which opens to the interior of the vessel.

On the sleeve 120, located inwardly from the tubular member 114, is a collar 134 which encircles the sleeve. The collar 134 is attached to the sleeve about its outer face 138, which is located adjacent the wall of the vessel 112, while its inner face 136 affords a bearing surface. Inwardly of the vessel is an annular disk spring 140 which encircles the sleeve 136 and seats against the inner face 136 of the collar 134 about its inner peripheral surface 142. About its outer periphery 144 the spring 140 is suitably attached to the vessel 112 by means of a plurality of studs 146 so that the spring may be tightened against drilled and tapped spacer members 148 disposed between the spring and the vessel wall.

In this arrangement the flexing action of the spring is directed against the collar 134 opposite in direction to the spring action induced in the arrangement shown in FIG. 1. The sleeve 120 is thus under compression and the resultant action forces the bearing surface 130 more firmly against the shoulder 126 of the tubular member 114. It will be understood that the degree of resiliency of the spring may be such that it will still maintain adequate compressive force on the sleeve even for the condition where contraction of the sleeve results due to a cooling effect produced by the fluid flowing therethrough. This same characteristic also applies to spring 40 in FIG. 1 which may be used to maintain the sleeve 20 in tension regardless of whether the temperature of the fluid flowing through it causes the sleeve to contract or expand in relation to the tubular member 14.

An an alternative to maintaining the sleeve in fluid-tight, surface-to-surface engagement with the tubular member to assure that there is substantially no leakage of the fluid entering the vessel into the annular space between the sleeve and the tubular member, Belleville springs may be disposed between the opposed bearing surfaces of the sleeve and the tubular member as shown in FIGS. 3A and 3B. In FIG. 3A, which has a sealing arrangement similar to that shown in FIG. 1, the tubular member 214 has an inwardly projecting rib section 224 which forms a shoulder 226. The sleeve 220 has an outwardly disposed rim 229 forming a lip 230 at its outer end. Within the annular space defined by the coaxially disposed tubular member 224 and sleeve 220 and positioned between the shoulder 226 of the tubular member and the lip 230 of the sleeve is an annular-shaped Belleville spring 250.

By employing the action of the spring 40 shown in FIG. 1, the sleeve 220 will be forced against the Belleville spring 250, producing a substantially fluid-tight engagement between the sleeve and the rib 224 of the tubular member. In this arrangement the seal between the sleeve and the tubular member is affected not by the contacting of sleeve and tubular member surfaces, but by the tightly fitting engagement of the spring 250 with the oppositely opposed lip 230 of the sleeve and shoulder 226 of the tubular member.

In FIG. 3B the arrangement of the tubular member 314 and the sleeve 320 at its inner end is similar to that illustrated in FIG. 2, where the disk spring 140 creates the compressive force to effect the seal between the tubular member and the sleeve. Between the inwardly projecting shoulder 326 on the tubular member and end surface 330 associated with the enlarged end of the sleeve 320 is a Belleville spring 350. The action of the compressive forces upon the sleeve 320 similarly imposed as described in respect to FIG. 2 depresses the spring 350 so that it is in fluid-sealing engagement with the tubular member, the shoulder 326 cooperating with the end surface 330 of the sleeve to form the seal.

In place of the single sleeves in FIGS. 1 and 2, FIG. 4 illustrates a double-sleeve arrangement 421 in engagement with the tubular member 414. The inner end 416 of the tubular member 414 is integrally attached to the vessel, as at 417. Within the tubular member there is concentrically positioned the double sleeve 421 comprising an inner sleeve 421A and an outer sleeve 421B. The outer end 423A of the inner sleeve is disposed outwardly from the outer end 423B of the outer sleeve. Both sleeves extend inwardly, projecting into the vessel, with the inner end of the inner sleeve extending inwardly from the inner end of the outer sleeve. The inside surface of the tubular member 414, near the outer extremity of the member, is arranged to provide a recess or groove 452. The surface of the tubular member adjacent the groove 452 extends inwardly forming an annular-shaped inwardly projecting rib 424. The inside diameter of the tubular member 414 adjacent the vessel 412 is such that insertion of the inner sleeve 421B can be accomplished from inside the vessel. As in FIGS. 1 and 2, where the outer ends of the sleeves have increased thicknesses, the outer ends of the inner and outer sleeves 423A, 423B similarly have an increased outside diameter which forms bearing surfaces 430A and 430B, respectively. The inner sleeve bearing surface 430A seats against bearing surface 426 within the groove 452. The bearing surface 430B on the outer sleeve seats against the inner surface 454 of the rib 424. Because the sleeves are in spaced relationship with one another and with the tubular member 414, a pair of concentric annular passageways 432A, 432B are formed which open to the interior of the vessel.

Positioned about the inner sleeve, and inwardly of the inner end of the outer sleeve, is a collar 434. This collar 434 is attached at its inner face 436 to the inner sleeve. The outer face 438 of the collar 434 forms a bearing surface.

Disposed about the inner end of the inner sleeve 421A is a U-shaped annular, double-disk spring 460 with the U opening inwardly towards the inner sleeve. One leg 462 of the spring bears against the inner end of the outer sleeve 421B while the other leg 464 bears against the outer face 438 of the collar 434 on the inner sleeve. A drain hole 466 is provided in the disk at its bight.

In this arrangement the spring 460 exerts a compressive force on the outer sleeve 421B and a tensile force on the inner sleeve. Due to this action of the spring, the outer end 423B of the sleeve 421B is forced into substantially fluid-tight engagement with the opposed surface 430B of the tubular member. Similarly, at its outer end 423A the inner sleeve 421A is held in fluid-tight engagement with bearing surface 430A of the tubular member.

Spacers 468 are positioned about the outer surface of the outer sleeve to maintain it in spaced relationship with respect to the tubular member. Similarly, the inner and outer sleeves are spaced from one another by means of suitable spacers 470 located on the inner end of the outer sleeve.

In FIG. 5 there is shown in more detail the arrangement of the spring 40 about the sleeve 20. As mentioned previously, the collar 34 is made in two separate, substantially semi-circular pieces 34A and 34B for ease in assembly upon the sleeve once it is positioned within the tubular member 14. The collar is welded to the sleeve about its inside face 36 so that the opposite or outer face 38 is available as a bearing surface. In addition, the split collar affords a means of communication between the vessel 12 and the annular space 32 between the nozzle 14 and the sleeve 20.

Figure 7:
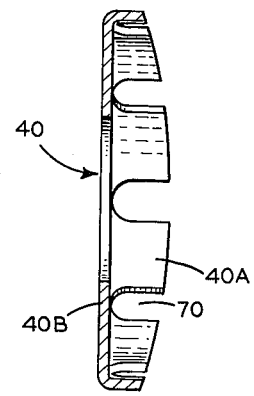
FIG. 7 is a sectional view of the spring taken along line 7—7 in FIG. 6.

The annular-shaped disk spring 40 is disposed about the sleeve 20 with its inner periphery bearing against the collar 34 on the sleeve. As can be noted in FIGS. 5, 6 and 7, the disk spring has an outer edge portion or rim 40A bent at right angles to the body of the disk spring 40B, which extends radially outward from the sleeve. As shown, the edge portion 40A is of varying height about its periphery since it is proportioned to fit against the vessel 12, which has a curved inner surface. At spaced positions about the edge portion 40A, grooves 70 are formed to improve the flexibility of the spring. Weld beads 72 are disposed on the inner surface of the vessel in register with the grooves in the disk spring to prevent rotation of the spring once it has been set in position.

In the arrangement of the thermal sleeve shown in FIG. 1 the sleeve is first inserted through the tubular member and into the vessel. The outer ends 22 of the sleeve are rolled into engagement with the bearing surface 26 on the tubular member. The disk spring is passed over the sleeve so that it bears against the vessel wall. Before the collar is welded onto the sleeve the body portion 40B of the disk spring is compression-loaded by externally applied force so that the collar may be welded in its proper position. After the collar is welded onto the sleeve the externally applied force is removed from the disk spring, and it seats itself against the outer face 3 on the collar. While the direction of the force against the collar is away from the adjacent vessel wall, the opposite end of the sleeve bears against the tubular member so that the sleeve is paced in tension. Variations in temperature between that of the fluid flowing through the sleeve and that within the vessel, while tending to change the relative dimensions of the sleeve and the distance between its bearing surfaces will be counteracted by the spring, which will keep the sleeve securely seated against the bearing surface shoulder 26 of the tubular member.

In FIG. 2, since the thermal sleeve arrangement places the sleeve in compression, the disk spring would be assembled after the collar is placed upon the sleeve tightening of the studs 146 providing the necessary compressive force. In FIG. 4, where the double spring is employed, a procedure, somewhat similar to that followed for the assembly of FIG. 1, would be used in arranging the spring and collar in the proper relationship. In FIG. 4 the spring will force the outer sleeve into compression against the tubular member while it exerts a tensile force on the inner sleeve keeping it in fluid-tight relationship with the tubular member.

In the various embodiments which have been disclosed the bearing surface of the sleeve is maintained in substantially fluid-tight relationship against the opposed bearing surface of the tubular member. This prevents by-passing of the incoming fluid into the annular space or spaces between the sleeve or sleeves and the tubular member, which would result in the inducing of thermal shock stressing of the tubular nozzle and of the walls of the vessel. By means of this invention the thermal sleeve is advantageously in contact with, but structurally independent of, its corresponding nozzle, the action of the spring assuring that the seal between the sleeve and the tubular member or nozzle will be maintained.

While in accordance with the provisions of the statutes, I have illustrated and described herein a specific form of the invention now known to me, those skilled in the art will understand that changes may be made in the form of the apparatus disclosed without departing from the spirit of the invention covered by my claims, and that certain features of the invention may sometimes be used to advantage without a corresponding use of the other features.

What is claimed is:
1. A thermal sleeve arrangement comprising:
    (A) a vessel having an opening therein,
    (B) a tubular member attached to said vessel at the opening therein concentric with said opening and extending exteriorly from said vessel,
    (C) a sleeve disposed within said tubular member and having its outer end located within said tubular member exteriorly of said vessel and its inner end located within said vessel, said outer end having a radially extending outer portion defining a bearing surface generally normal to the axis of said sleeve,
    (D) said sleeve arranged within said tubular member for forming an annular space therebetween,
    (E) a shoulder formed on the inner surface of said tubular member outwardly from said vessel,
    (F) said bearing surface on said sleeve at its outer end arranged to removably seat against said shoulder on said tubular member,
    (G) mechanical resilient spring means in engagement with the interior surface of said vessel and said sleeve and positioned inwardly from said bearing surface for maintaining said bearing surface in substantially fluid-tight engagment with the shoulder on said tubular member, and
    (H) means to retain said spring means against movement with respect to at least one of said sleeves and the interior surface of said vessel.

2. A thermal sleeve arrangement as set forth in claim 1 wherein a collar is disposed about and attached to said sleeve near its inner end and provides a seating surface on said sleeve against which said spring member bears.

3. A thermal sleeve arrangement as set forth in claim 2 wherein said spring member comprises an annular-shaped disk spring disposed about said sleeve seating against said collar about its inner peripheral surface and against said vessel about its outer peripheral surface.

4. A thermal sleeve arrangement as set forth in claim 3 wherein said disk spring contains openings therein about its outer periphery to permit fluid within said vessel to flow into the annular space between said sleeve and annular member.

5. A thermal sleeve arrangement as set forth in claim 3 wherein said disk spring is attached to said vessel and bears against the face of said collar which is disposed transversely of the axis of said sleeve and is remote from said vessel whereby a compressive force is exerted on said sleeve for maintaining it in fluid-tight relationship with said tubular member.

6. A thermal sleeve arrangement as set forth in claim 3 wherein said disk spring is seated against said vessel about its outer periphery and against the face of said collar which is disposed transversely of the axis of said sleeve and is directed toward said vessel whereby a tensile force is exerted on said sleeve for maintaining it in fluid-tight relationship with said tubular member.

7. A thermal sleeve arrangement as set forth in claim 1 wherein the annular space between said tubular member and sleeve is open to the interior of said vessel for receiving the fluid contained within said vessel.

8. A thermal sleeve arrangement as set forth in claim 7 wherein spacers are disposed in the annular space between said sleeve and tubular member for maintaining the surfaces thereof in spaced relationship.

9. A thermal sleeve arrangement as set forth in claim 1 wherein an annular-shaped transversely arranged spring is positioned between said tubular member and sleeve with its outer edge bearing against the shoulder on said tubular member and its inner edge bearing against the bearing surface on said sleeve whereby a fluid-tight seal is established therebetween.

10. A thermal sleeve arrangement comprising:
    (A) a vessel having an opening therein,
    (B) a tubular member attached to said vessel at the opening therein concentric with said opening and extending exteriorly from said vessel,
    (C) a first sleeve disposed within said tubular member and having its outer end located within said tubular member exteriorly of the vessel and its inner end located within said vessel, said outer end having a radially extending outer portion defining a bearing surface generally normal to the axis of said sleeve,
    (D) a second sleeve disposed within said tubular member and concentrically arranged about said first sleeve having its outer end located within said tubular member exteriorly of said vessel and its inner end located within said vessel, said outer end of said second sleeve having a radially extending outer portion defining a bearing surface generally normal to the axis of said sleeve,
    (E) said second sleeve and tubular member forming a first annular space,
    (F) said second sleeve spaced from said first sleeve forming a second annular space,
    (G) an inwardly directed projection formed on the inner surface of said tubular member outwardly from said vessel, said projection providing a first shoulder facing outwardly from said vessel and a second shoulder facing inwardly toward said vessel,
    (H) said bearing surface on said first sleeve at its outer end arranged to removably seat against the first shoulder on said tubular member,
    (I) said bearing surface on said second sleeve at its outer end arranged to removably seat against said second shoulder on said tubular member,
    (J) said first sleeve having its inner end extending inwardly into said vessel beyond the inner end of said second sleeve, and
    (K) mechanically resilient spring means in substantially circumferential engagement with said inner sleeve inwardly from the inner end of said second sleeve and in engagement with the inner end of said second sleeve for maintaining said bearing surface on said first sleeve in substantially fluid-tight engagement with the first shoulder on said tubular member by maintaining said first sleeve in tension while maintaining said bearing surface on said second sleeve in substantially fluid-tight engagement with the second shoulder on said tubular member by maintaining said second sleeve in compression.

11. A thermal sleeve arrangement as set forth in claim 10 wherein a collar is disposed about and attached to said sleeve, said second sleeve terminates within said vessel in a transverse plane located between said vessel and said collar on said sleeve, and a U-shaped double disk spring comprising said annular spring means seated at the end of one leg against the collar on said sleeve and at the end of the other leg against the end of said second sleeve whereby said sleeve is placed in compression for maintaining a fluid-tight seal between said sleeves and the shoulder in said tubular member.

(References on following page)

References Cited by the Examiner
UNITED STATES PATENTS

| | | | |
|---|---|---|---|
| 1,779,941 | 10/1930 | Kerr | 122—365 |
| 2,063,441 | 12/1936 | Kerr | 122—476 X |
| 2,203,357 | 6/1940 | Kerr | 122—365 |
| 2,252,069 | 8/1941 | Fletcher | 122—365 |
| 2,331,932 | 10/1943 | Rowand | 122—365 |
| 2,468,847 | 5/1949 | Trainor | 285—319 X |
| 2,627,429 | 2/1953 | Engleman | 285—55 X |
| 2,633,831 | 4/1953 | Langvand | 122—336 |

CARL W. TOMLIN, *Primary Examiner.*